March 30, 1943.  C. A. FLOOD  2,315,411
SEALING APPARATUS
Filed Sept. 10, 1940   11 Sheets-Sheet 2

March 30, 1943.   C. A. FLOOD   2,315,411
SEALING APPARATUS
Filed Sept. 10, 1940   11 Sheets-Sheet 4

March 30, 1943.  C. A. FLOOD  2,315,411
SEALING APPARATUS
Filed Sept. 10, 1940  11 Sheets-Sheet 7

March 30, 1943. C. A. FLOOD 2,315,411
SEALING APPARATUS
Filed Sept. 10, 1940 11 Sheets-Sheet 10

Inventor
Carl A. Flood
By Roberts, Cushman & Woodberry
his Attys.

March 30, 1943.  C. A. FLOOD  2,315,411
SEALING APPARATUS
Filed Sept. 10, 1940  11 Sheets-Sheet 11

Patented Mar. 30, 1943

2,315,411

UNITED STATES PATENT OFFICE 2,315,411

SEALING APPARATUS

Carl A. Flood, Framingham, Mass., assignor to Dennison Manufacturing Company, Framingham, Mass., a corporation of Massachusetts Application September 10, 1940, Serial No. 356,147

18 Claims. (Cl. 91—16)

This invention relates to apparatus for applying seals to articles of various kinds, particularly jars or other containers having caps or other closures. The seals may be applied merely for decoration or in such location and manner as to prevent unauthorized opening of the article or for both purposes. In most cases the seals are impressed with a stamp or other shaper before they harden. The invention also involves the combination with means for sealing jars, of means for filling and capping the jars and, if desired, means for evacuating the jars.

Objects of the invention are to provide apparatus which seals articles rapidly and economically, which applies the seals to articles of various sizes and shapes, which locates the seals accurately and uniformly, which does not trail threads of sealing material across the articles, which is adjustable to different conditions, which is adapted to apply seals to containers in such manner that the closures cannot be removed without breaking the seals and which is generally superior to prior sealing apparatus.

In one aspect the invention comprises a reservoir for the sealing wax or other seal material in combination with a dispenser for delivering a gob of the material from the reservoir to the container or other article and means for disconnecting the trailing end of the gob which, because of the tacky nature of the material, hangs on the dispenser. While the disconnector may comprise any one of several means, such as a heated wire or a blow torch, it is preferably in the form of pincers chilled sufficiently to prevent adhesion of the wax so that said end is not merely transferred from the dispenser to the disconnector. The dispenser may comprise a nozzle with a plunger or other means for extruding the recurrent gobs of material from the nozzle. To extrude the material into restricted spaces, such as the crack between a container and the edge of a cover for the container, the nozzle may comprise a slit or the equivalent thereof, such as a row of juxtaposed outlets, and the nozzle may be presented to the article with the slit extending lengthwise of the crack. To locate the gob of sealing material accurately on a predetermined spot, the article is first presented close to the end of the nozzle and then, while the gob is being extruded, the article and nozzle are separated by relative movement away from each other; otherwise the gob of material might curl to one side or another and contact the article at a location other than the predetermined spot.

In another aspect the invention comprises a stamp for impressing the gob of sealing material after the gob has been deposited on the article. The stamp may be used merely to shape the seal or to press the material into a crack or both. The stamp should be cooled not only to harden the sealing material more quickly but also to prevent the material from sticking to the stamp.

In still another aspect the invention involves means for delivering a container to a location in upright position and then overturning the container, preferably through approximately 90°, preparatory to receiving the aforesaid gob of sealing material on the side of the container. The tipping means is preferably associated with a turret which rotates step by step to bring the container to different stations, such as a sealing station where the gob of sealing material is deposited on the container, a stamping station where the gob is shaped and cooled and a delivery station where the container leaves the turret. In the preferred form of the invention each container is tipped over as it approaches the first station and is tipped back to upright position as it approaches the last station.

For the purpose of illustration a typical embodiment of the invention is shown in the accompanying drawings in which—

Figure 1:
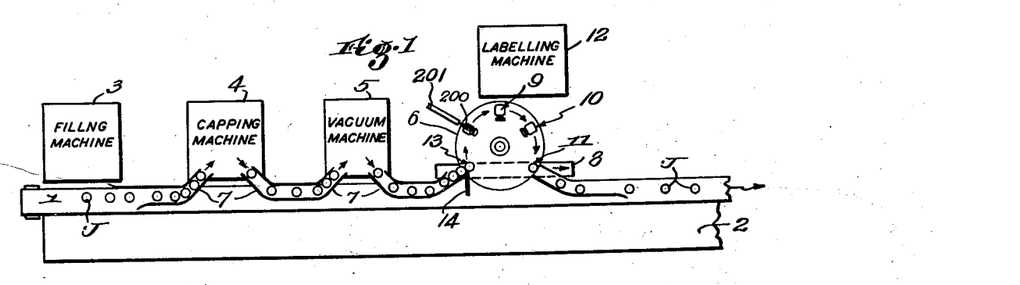
Fig. 1 is a diagrammatic plan view of an entire installation.

As illustrated in Fig. 1 the particular embodiment of the invention chosen for the purpose of illustration comprises a conveyor belt 1 feeding to the right over a table 2, past a series of locations occupied by a filling machine 3, a capping machine 4, a vacuum machine 5 and a rotating turret 6, the installation being particularly intended for use in filling glass jars with ground coffee, capping the jars, evacuating the air from the jars before the caps are tightly seated and then applying a seal to the side of the jar at the junction between the jar and cap to produce a product such as described and claimed in my pending application Serial No. 337,139, filed May 25, 1940.

As shown in Fig. 1 the jars J are directed to and from the various machines along the path of the conveyor belt 1 by means of guide rods 7. The means for transferring the jars from the belt 1 to the turret 6 comprises not only the sets of guide rods but also a short conveyor belt 8 extending parallel to the belt 1 and feeding in the same direction. As hereinafter described more in detail, the turret 6 rotates intermittently step by step to carry the jars to different stations around the turret. These stations include the one occupied by jar 9 at which a gob of the sealing material is applied to the side of the neck of the jar, the station occupied by the jar 10 at which the gob of sealing material is shaped into a seal and a delivery station 11 at which the jars are delivered from the turret back to the conveyor belt 1. At the sealing station 9 a label may also be applied to the side of the jar by means of a suitable labeling machine such as indicated at 12. As the jars are moved from the receiving station 13 to the sealing station 9 they are turned from upright position to a tipped position approximately 90° from the upright position, and as successive jars move from the stamping position 10 to the delivery position 11 they are tipped back into upright position. A stop 14 holds back the incoming jars until the foremost jar is picked up by the turret and started around the circular path of the turret.

The mechanism at the turret station comprising a base 15 upon which is mounted the aforesaid labeling machine 12 (Figs. 3 and 4) and a pedestal 16. Fast to the pedestal 16 by means of a pin 17 is an upright tubular post 18 in which a rod 19 moves up and down in response to a cam-actuated arm 20 (Figs. 5, 11 and 12), the arm being actuated by cam 28 on shaft 29. Journaled on the upright tube 18 through the medium of ball bearings 21 (Fig. 8) and 22 (Figs. 11 and 12) is a sleeve 23 having a horizontal flange 24 at its upper end and the rotating slotted portion 25 of a Geneva movement at its lower end. Mounted on the flanges 24 is a ring 26 carrying the mechanism for picking up the jars, tipping them over and holding them in various positions while they are stepped around by the turret.

As shown in Figs. 6 to 9 and other figures, the Geneva movement comprises the aforesaid slotted portion 25 containing slots 27, a rotating disk 48 on shaft 29, the disk 48 carrying an oblique arm 30 upon which is rotatably mounted a roller 31 adapted to fit into the slots 27. With the shaft 29 rotating in the direction of the arrow in Fig. 6 the roller 39 enters one of the slots from the bottom while it occupies the lower right-hand position in Fig. 6 and it leaves the slot from the bottom while the slot occupies the position at the lower left-hand side of Fig. 6. Thus during approximately the first half of each revolution of the disk 28, while the roller 31 is in one of the slots 27, the Geneva wheel 25 is rotated in a clockwise direction (Fig. 6) 60°.

The shaft 29 is rotated by means of a chain 32 leading to a sprocket wheel 33 on shaft 34 of the labeling machine 12 (Fig. 3), the shaft 34 being driven through gears 35, shaft 36 and a belt 37 leading to a suitable source of power. The labeling machine is driven from the gear 35 through a clutch 38. The aforesaid belt 8 is driven through sprocket chain 39, reducting gearing 40 and a drum 41. The drum 42 at the other end of the belt is adjustable by means of screws 43 for the purpose of taking up slack in the belt.

For the purpose of holding the Geneva wheel 25 in each of its six positions a lock 44 is adapted to move into the right-hand slot (Fig. 6) the moment the roller 31 leaves the wheel. As shown in Figs. 4, 5, 6 and 8 the lock 44 is mounted on the end of the rocker arm 45 by means of a screw 46, the arm 45 being fast to the rocker shaft 47. As shown in Figs. 5 and 7 the rocker shaft 47 is actuated by a cam 48 having a cam groove 49 to receive a follower 50 on the end of an arm 51 fast to the shaft.

Figure 3:
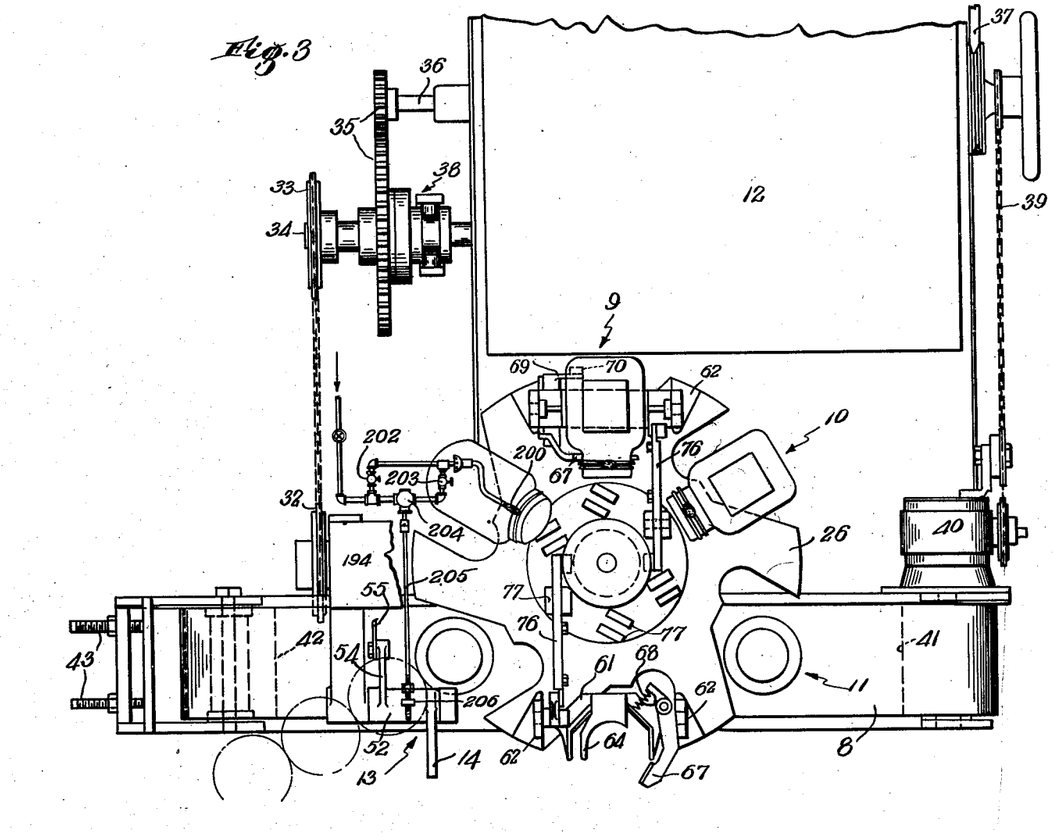
Fig. 3 is a plan view of the sealing and labeling apparatus with parts in zero or starting position and other parts broken away.
Figure 4:
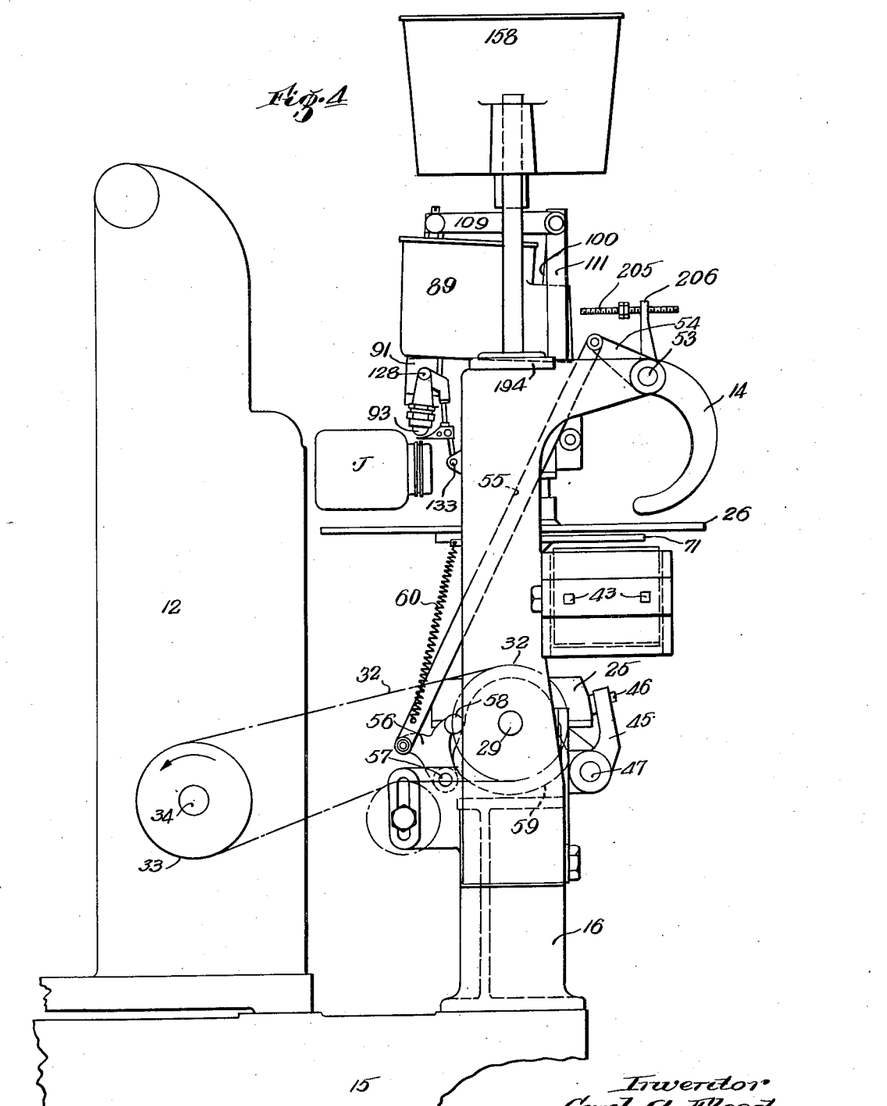
Fig. 4 is a side elevation of the sealing and labeling apparatus with the moving parts in the positions they occupy after the main shaft has turned approximately 345° from starting position, some of the parts being omitted.
Figure 5:
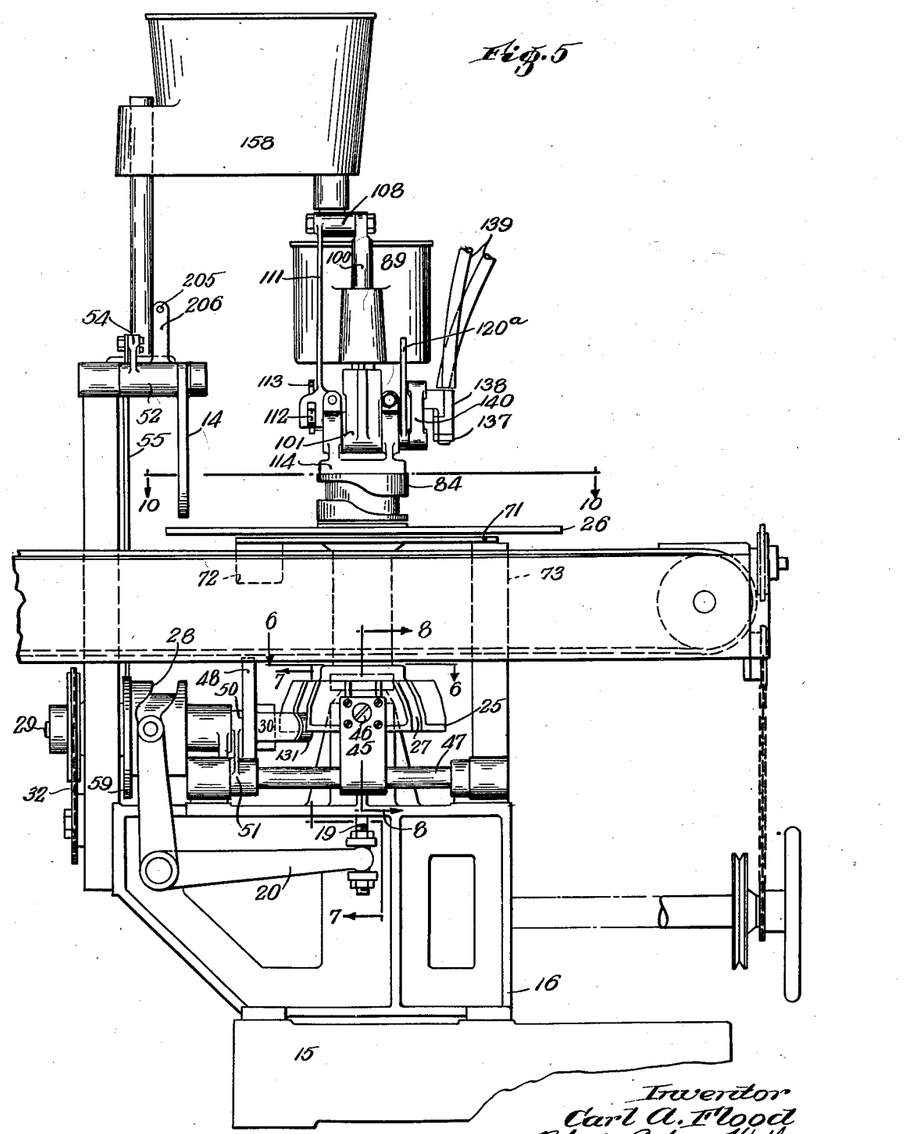
Fig. 5 is a front elevation of the sealing apparatus with parts omitted and with the other parts in starting position.
Figures 6, 7, 8, 9:
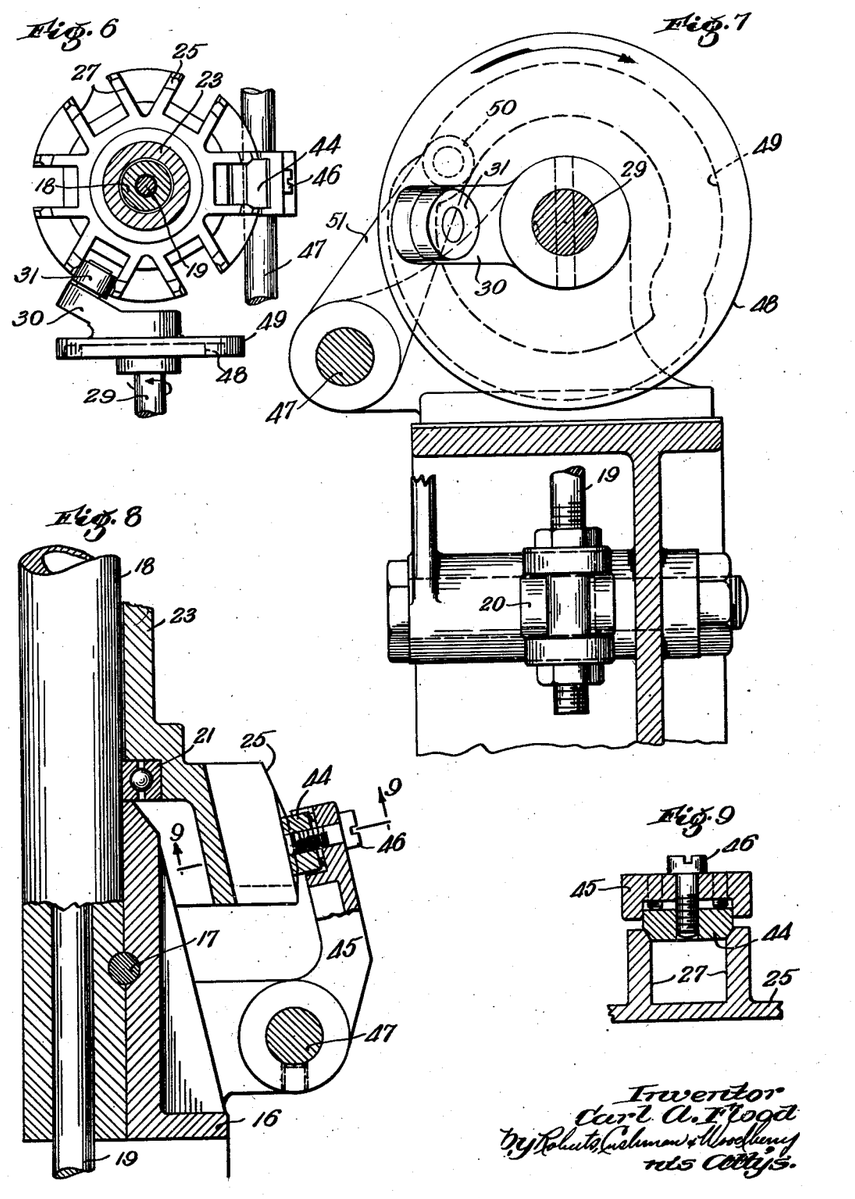
Fig. 6 is a top plan view of the Geneva movement taken on the line 6—6 of Fig. 5, showing the parts in the positions they occupy after the main shaft has turned 180° from starting position.
Fig. 7 is a section on line 7—7 of Fig. 5, showing the parts in starting position.
Fig. 8 is a section on line 8—8 of Fig. 5, showing the parts in a position between 185° and 355°.
Fig. 9 is a section on line 9—9 of Fig. 8.
Figure 10:
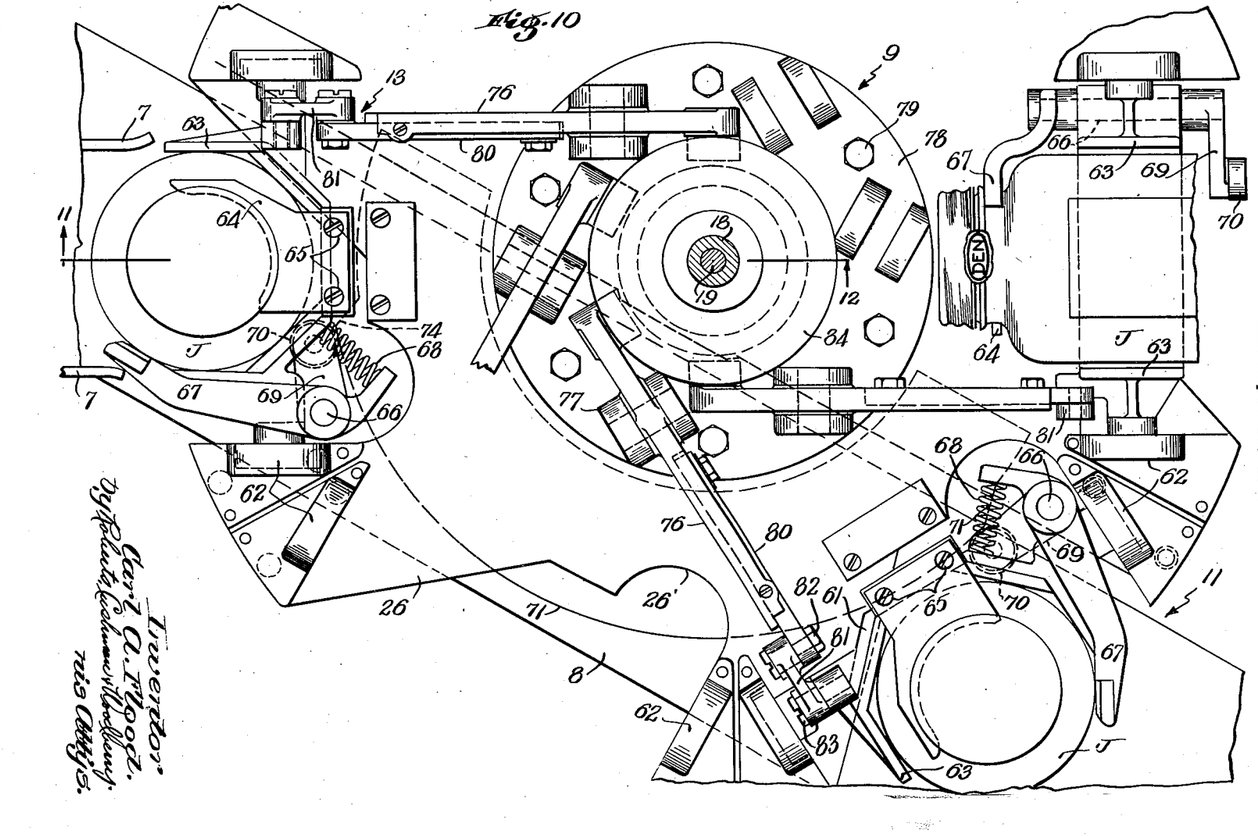
Fig. 10 is a top plan section on line 10—10 of Fig. 5 showing the parts in starting position.

As shown in Figs. 3, 4, and 5 the aforesaid jar stop 14 is fast to a sleeve 52 which is oscillated back and forth around the shaft 53 through the medium of arm 54, link 55, arm 56, pivoted at 57 and a cam follower 58 bearing on cam 59 fast to the aforesaid shaft 29, a spring 60 serving to hold the follower 58 against the cam 59.

As illustrated particularly in Figs. 3, 5, 10, 11 and 12 the turret mechanism for holding and tipping the jars comprises fixed yokes 61, 64 journaled in bearings 62 on opposite sides of the recesses 26' in the ring 26. Each yoke 61 comprises jaws 63 for engaging the sides of the jars and a jaw 64 mounted on the yoke by means of screws 65 for engaging one side of the neck of the jar. Pivotally mounted in the yoke 61 is a shaft 66 to the upper end of which is fastened a movable jaw 67 for engagement with the opposite side of the neck of the jar, the jaw 67 being yieldably urged toward the neck of the jar by means of a spring 68. To move the jaw 67 out of engagement with the jar an arm 69 fast to the lower end of the shaft 66 carries a cam follower 70 engageable with the outer periphery of the semi-circular cam 71 mounted on the stationary parts of the apparatus as indicated at 72 and 73 in Fig. 5. As a jar approaches the delivery station 11 the associated follower 70 strikes the rise in the cam 71 and retracts the finger 67 to the position shown at the delivery station 11 and the receiving station 13 in Fig. 10. As the jaw retracts at the delivery station the jar is released and carried away by the belt 8. Inasmuch as the jaw 67 remains in retracted position until the yoke reaches the receiving station 13 the foremost jar may be moved to the position shown at the left-hand end of Fig. 10 by the belt 8, when the jar stop 14 is retracted, to permit the foremost jar to enter the clamp. The moment the clamp at the receiving station starts to leave that station the associated cam follower 70 rides down the incline 74 (Fig. 10) of the cam 71 permitting the spring 68 to move the jaw 67 to the clamping position shown in Figs. 11 and 12. As shown in these figures the width of the clamp 67 is such that the clamp fits between the bead 75 on the neck of the jar and the shoulder at the junction between the neck and the body of the jar, thereby accurately positioning the jar lengthwise of the axis of the jar as well as transversely of the axis.

Figure 11:
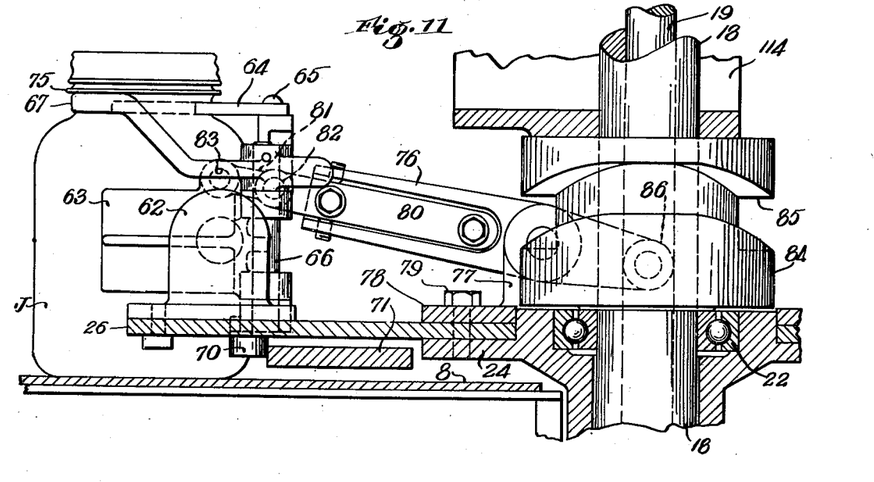
Fig. 11 is a section on line 11—12 of Fig. 10, showing the parts in approximately 20° position.
Figure 12:
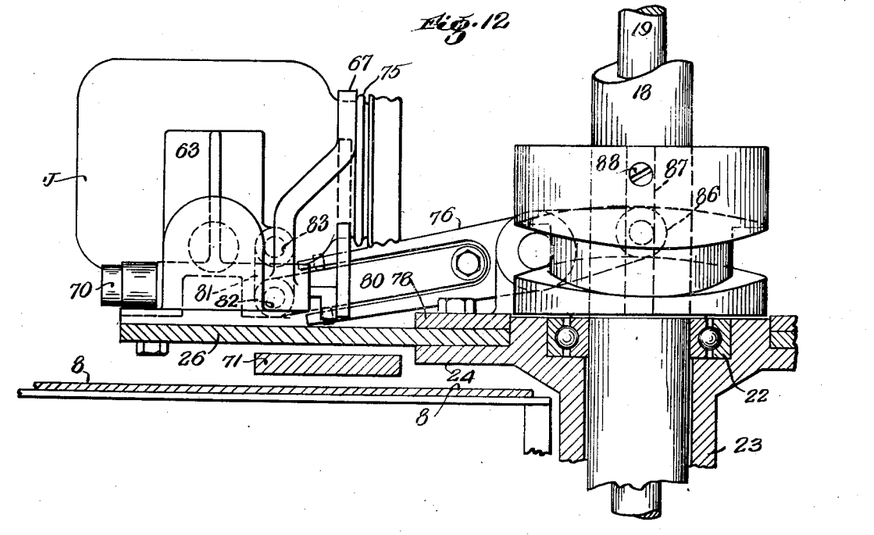
Fig. 12 is a similar section showing the parts in approximately 160° position.

After a jar has been picked up from the belt 8 as aforesaid it is tipped inwardly from the upright position shown in Fig. 11 to the horizontal position shown in Fig. 12 while the jar is conveyed two steps through 120° from the receiving station 13 to the sealing station 9. For this purpose the yoke 61 is rotated in the bearing 62 through 90° by means of an arm 76 pivoted in lugs 77 projecting upwardly from the ring 78 which is secured to the aforesaid flange 27 by means of machine screws 79. On its outer end the arm 76 carries an adjustable extension 80 to vary the length of the arm, the extension being pivotally connected to the yoke 61 through the medium of a link 81, the link being connected to the arm by pivot pin 82 and to the yoke by pivot pin 83. The means for tipping the arm 76 back and forth between the two positions shown in Figs. 11 and 12 comprises a cam collar 84 having a cam groove 85 to receive the cam follower 86 on the inner end of the arm 76. The lower end of the collar 84 has a boss seating on the inner stationary ring of the ball bearing 22 and the collar is held against rotation relatively to the stationary tubular post 18 by means of a key 87 held in a keyway in the post 18 by means of a set screw 88. The cam groove 85 is shaped to tip the jar from the upright position shown in Fig. 11 to the horizontal position shown in Fig. 12 between the receiving station 14 and the sealing station 9 and then to tip the jar back to upright position again between the stamping station 10 and the delivery station 11.

As shown in Figs. 4, 5, 13, 14, 15 and 19 the mechanism at the sealing station for depositing a gob of sealing material on the neck of the jar at the sealing station comprises a sealing wax pot 89 having inner and outer walls between which is located an electric heating coil 90 for maintaining the wax in molten condition and a larger wax reservoir 158. As shown in Fig. 16 the wax pot has a nozzle for depositing sealing material on the jar the nozzle comprising a sleeve 91 threaded into an opening in the bottom of the pot, a coupling 92, a tip 93 and a union 94 for holding the tip on the coupling. Fitted into the coupling 92 is a sleeve 95 the upper end of which seats against an internal shoulder on the coupling and the lower end of which seats against the tip 93. Near its lower end the sleeve 95 has an internal valve seat 96 against the lower side of which a ball valve 97 is seated by means of the spring 98. Above the valve seat the sleeve has a cylindrical portion 95$^a$ constituting a cylinder to receive the end of a wax extruding plunger 99 which moves relatively to the nozzle from the full to the dotted line position in Fig. 16. The sleeve 95 has an extension, above the upper end of the cylinder 95, said extension forming a guide for the plunger as the latter enters the upper end of the cylinder. As shown the guide comprises the tubular upper part 95$^b$ supported by diametrically spaced legs 95$^c$ whose lower ends are integral with the cylinder 95. The lower end of the plunger 99 has a head fitting fairly closely within the cylindrical portion of the sleeve 95 so that, when the plunger is retracted, it tends to create a vacuum in the cylinder, thereby quickly filling the cylinder with a new charge of wax the moment the plunger leaves the cylinder in its upward stroke.

Figure 13:
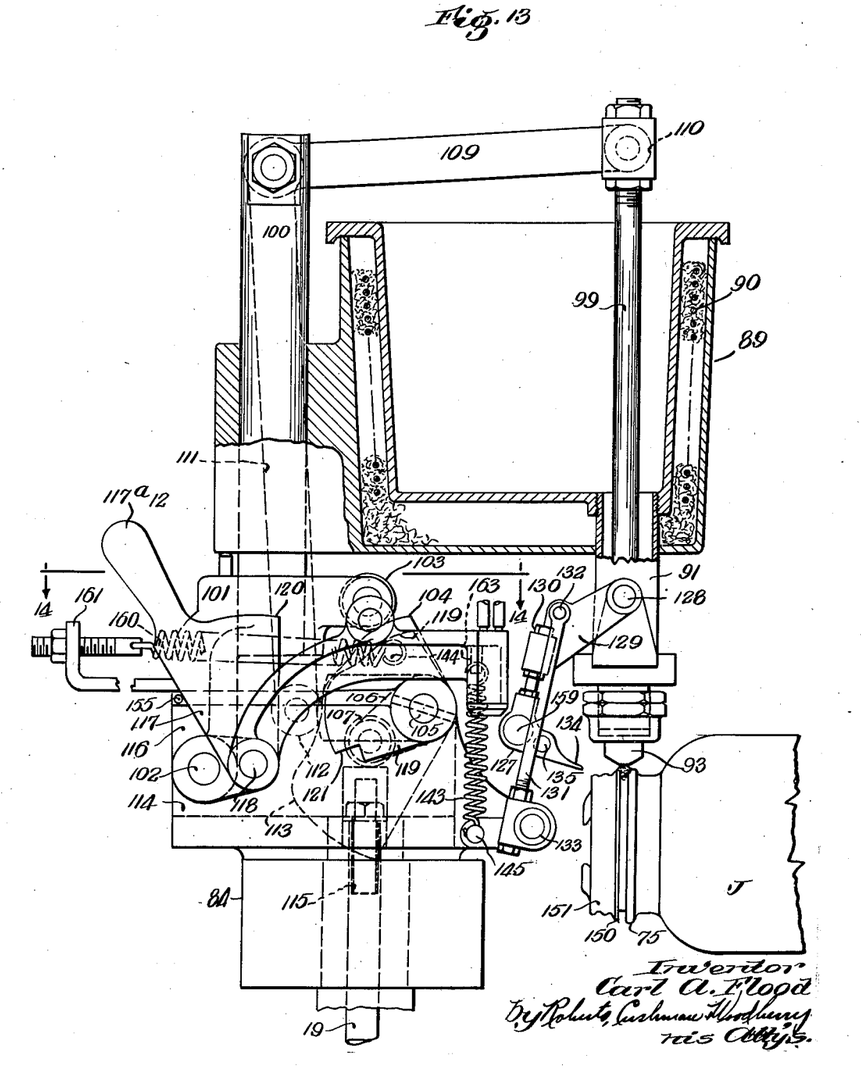
Fig. 13 is a side view of the sealing apparatus, with parts broken away, the moving parts being in approximately 235° position.
Figures 14, 15, 16:
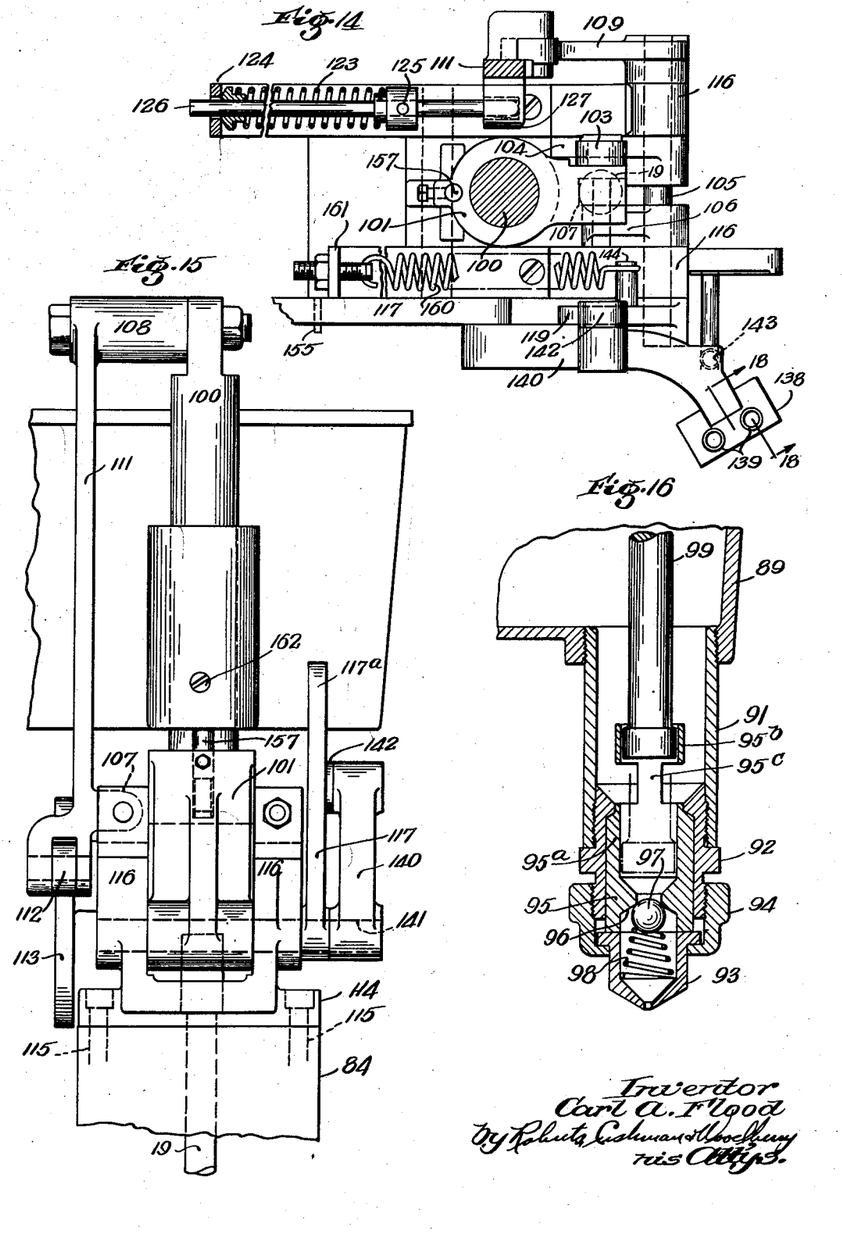
Fig. 14 is a section on line 14—14 of Fig. 13, showing the parts in approximately 235° position.
Fig. 15 is a rear view of the parts shown in Fig. 14, showing the parts in approximately 235° position.
Fig. 16 is a section on line 16—16 of Fig. 13, showing the parts in approximately 235° position.
Figure 17:
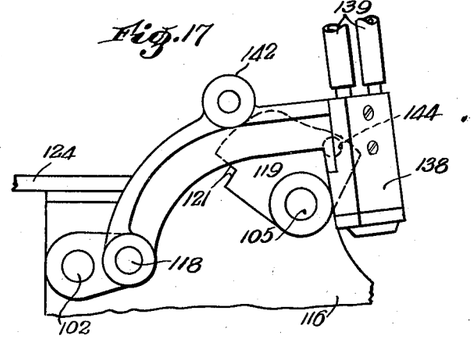
Fig. 17 is a side view of the seal stamper or shaper in starting position.
Figure 18:
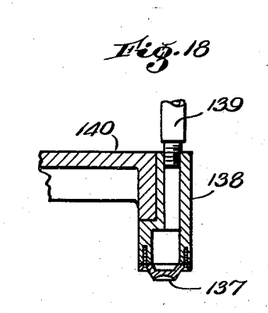
Fig. 18 is a section on line 18—18 of Fig. 14.
Figure 19:
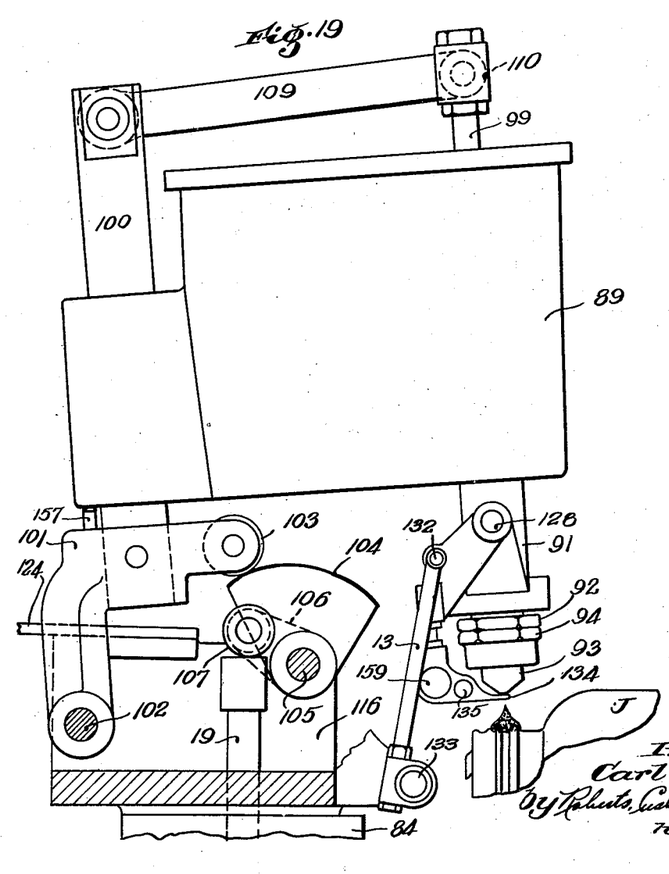
Fig. 19 is a side view of the sealing apparatus with parts omitted and with the moving parts in approximately 345° position.

As shown in Figs. 13, 15 and 19 the wax pot 89 is mounted on a post 100 which is fast to an arm 101, pivoted to the frame of the machine at 102 and carrying a cam follower 103 resting on the cam 104, fast to the rocker shaft 105. The vertical position of the wax pot on post 100 is adjusted by means of a pin threaded into the top of arm 101 and the wax pot is held in adjusted position by a set screw 162. The rocker shaft 105 is rocked back and forth through approximately 60° by means of an arm 106 carrying on its outer end a roller 107 which rests on the upper end of the aforesaid plunger 19. To hold the roller against the plunger a tension spring 160 is interconnected between a pin 144 on cam 119 and the upturned end of arm 161 (Figs. 13, 14 and 17). As shown in Fig. 13 the wax pot is tipped to its lower position wherein the tip of the nozzle is adjacent the neck of the jar, whereas in Fig. 19 the wax pot is tipped upwardly to its retracted position.

Not only is the nozzle of the wax pot moved up and down but the plunger is also moved up and down by means of the bell crank 108 (Fig. 15) having a horizontal arm 109 pivotally connected to the upper end of the plunger 99 at 110 and having a depending arm 111 carrying on its lower end a roll 112 bearing on the cam 113 fast to the rocker shaft 105. To hold the follower 112 against the plunger cam 113 a spring 123 is mounted between a stationary bracket 124 and a collar 125 fast to a rod 126 seating in a socket 127 in the side of the plunger arm 111 (Fig. 14).

As shown in Figs. 5, 11, 13, 15 and 19 the rocker shaft 105 is journaled in a bracket 114 mounted on the top of the stationary cam collar 84 by means of screws 115 (Fig. 15), the bracket comprising two upstanding portions 116 spaced apart lengthwise of the shaft 105. To hold the rocker shaft 105 in advanced position out of control of the plunger 19 the stop 117 is pivotally mounted on the bracket 114 at 118 for cooperation with a cam 119 on the rocker shaft, the shoulder 120 of the stop 117 being adapted to engage in the notch 121 in the cam 119 when the stop 117 is swung forwardly (to the right in Fig. 13) by means of a handle 117$^a$. A pin 155 limits the rearward movement of the stop 117.

Figure 2:
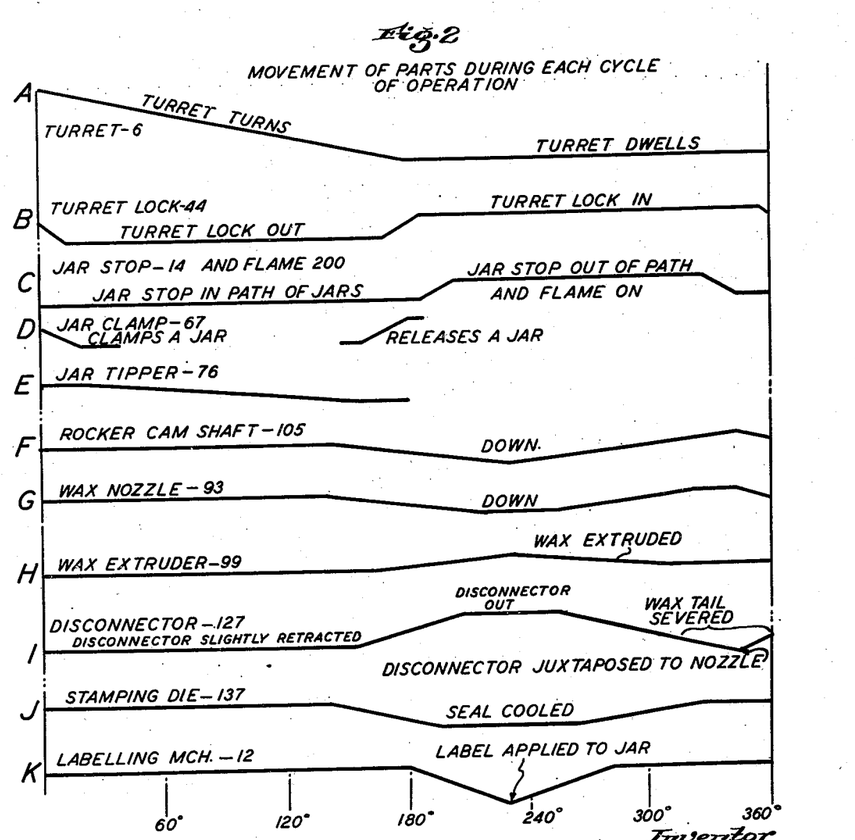
Fig. 2 is a diagram indicating the relative movements of the parts during one revolution of the main drive shaft.

The aforesaid cams are so timed that after the wax nozzle has been lowered into proximity to the neck of the container and just before the nozzle starts to retract sealing wax begins to be extruded from the nozzle as shown in Fig. 13. As the gob is extruded and the nozzle returns to the raised position shown in Fig. 19 a tail of sticky wax tends to hang on the retracting nozzle. To sever this trailing thread a disconnector 127 is pivotally mounted at 128 on one side of the nozzle 91 through the medium of an arm 129 which is adjustable in length by the adjusting means 130. A link 131 is pivotally connected to the arm 129 at 132 and to the bracket 114 at 133 for the purpose of swinging the disconnector from the retracted position shown in Fig. 13 to the advanced position shown in Fig. 19 as the nozzle is retracted. The disconnector 127 has a thin nose 134 constituting a knife for severing the trailing end of the gob of wax. To prevent the wax from sticking to the disconnector, the disconnector may be heated to a temperature somewhat higher than that of the nozzle by means of a heating coil 135 mounted in an opening in the disconnector, the temperature being controlled by thermostat 159. As shown in Fig. 19, the nose of the disconnector preferably comes into close juxtaposition but in slightly spaced relationship to the tip of the nozzle when the nozzle is completely retracted. As indicated in Fig. 2 the nozzle is completely retracted after the drive shaft has rotated through approximately 345° and then, as the shaft completes its rotation, the nozzle advances slightly, thereby slightly retracting the disconnector from beneath the nozzle.

Figures 20, 21, 22, 23, 24:
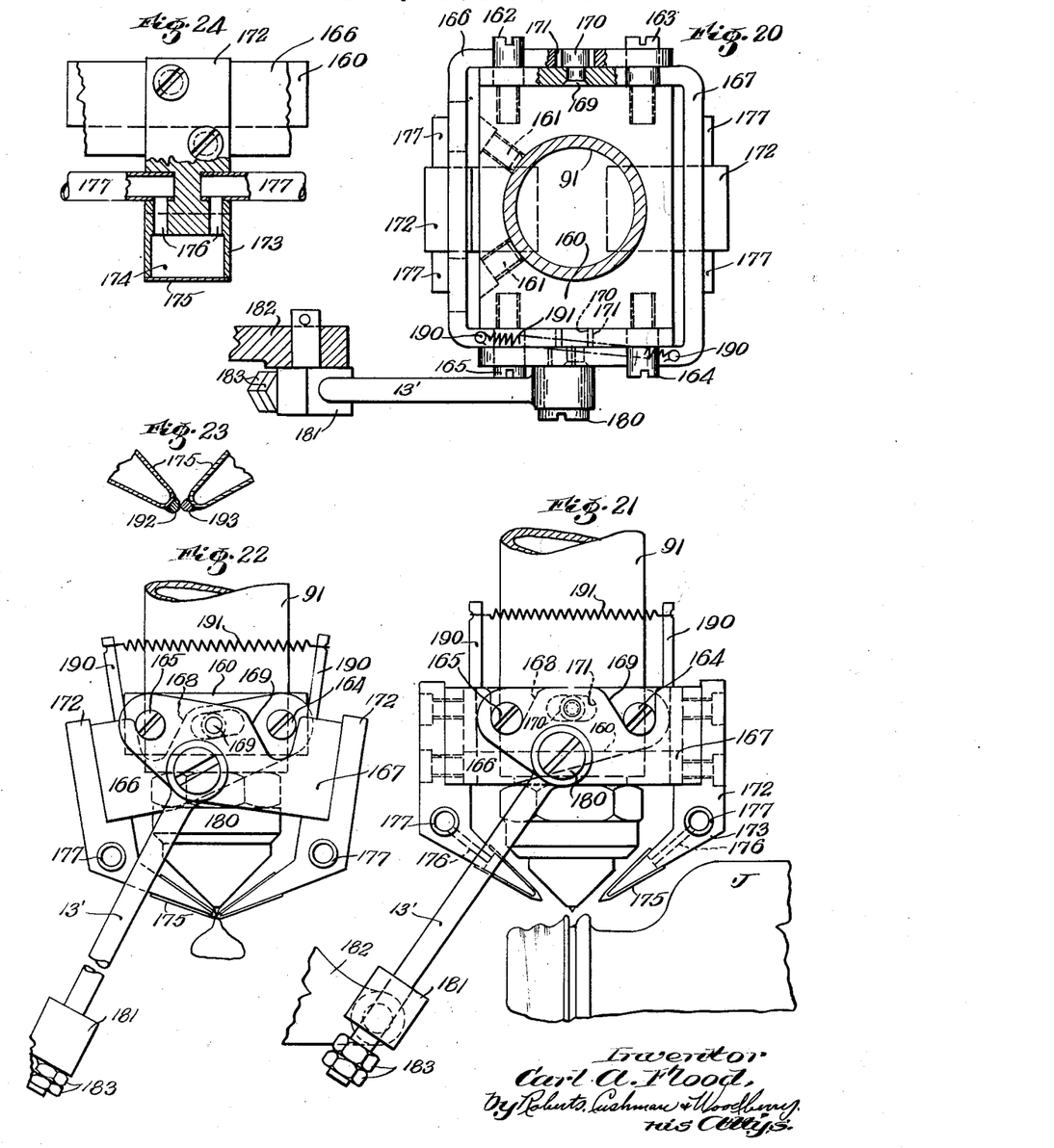
Fig. 20 is a top plan view of modified means for disconnecting the trailing end of a gob of sealing wax, the dispenser nozzle and other parts being shown in section.
Fig. 21 is a side elevation of the modified disconnecting means.
Fig. 22 is a similar view showing the parts in operative position.
Fig. 23 is a section through the tip of the disconnecting pincers.
Fig. 24 is a side view of the modified disconnecting means, viewed from the left-hand side of Fig. 20, showing one of the two pincers in section.

The modified means shown in Figs. 20 to 24 for disconnecting the trailing ends of the gobs of wax comprises a rectangular block 160 having a vertical central bore to receive the nozzle 91, the block being secured on the nozzle by means of set screws 161 (Fig. 20). Pivotally mounted on the ends of the block 160 by means of pivot pins 162, 163, 164 and 165 are two bail-like supports 166 and 167, the bail 166 being pivoted at 163 and 164 and the bail 167 being pivoted at 162 and 165. As shown in Figs. 21 and 22 the ends of the bails 166 and 167 are notched at 168 and 169 to accommodate the heads of the pivot pins of the other bails. The overlapping ends of the two bails are interconnected by rivets 169 fast to the ends of one bail and having enlarged heads 170 extending into slots 171 in the ends of the other bails. Thus, when one bail tips from the position shown in Fig. 21 to the position shown in Fig. 22 the other bail must tip likewise. The two jaws of the pincers are yieldingly urged toward the normal retracted position shown in Fig. 21 by means of a tension spring 191 interconnected between posts 190 projecting upwardly from the bails 166 and 167. Mounted on the outside of each bail is a head 172 having an inwardly and downwardly inclined tip 173 provided with a recess 174 at its lower end. Mounted or welded over the recessed end of the tip 173 is a cover 175 in the form of a sheet of copper or the like folded into V-shape. Thus the recess 174 is completely enclosed to form a hollow chamber. Leading upwardly from this chamber are two ducts 176, communicating with tubes 177 to which cooling liquid may be circulated to chill the tips 173.

The tips of the pincers may be reinforced with wear-resisting material and the tips may be shaped in various ways. For example, a piece of steel wire may be soldered along the edge of each tip, one piece 192 being ground with a flat surface and the other piece 193 being ground to a sharp edge (Fig. 23).

As in Fig. 19 the modified disconnector of Figs. 20 to 24 is actuated by a link 13' extending from the disconnector to a stationary part of the apparatus. At the upper end the link is pivotally connected at 180 to one leg of the bail 167 and at its lower end the link extends through a block 181 pivoted to a stationary part 182 of the machine. The action of the disconnector may be adjusted by the nuts 183 which engage the lower ends of the block 181 as the nozzle 91 rises away from the jar J. When the nozzle is in its lowermost position, shown in Fig. 21, the nuts 183 are preferably spaced away from the end 181 so that the pincers do not begin to move from their idle position shown in Fig. 21 to their operative position shown in Fig. 22 until the nozzle has lifted away from the jar a considerable distance. In the uppermost position of the nozzle the pincers engage each other to disconnect the trailing end of the gob of wax as shown in Fig. 22. By circulating cooling water through the pincers the molten sealing wax does not adhere to them.

While trailing ends of the gobs of wax may be prevented from sticking to the disconnector either by heating it well above the temperature of the wax or by chilling it well below the temperature of the wax, the latter is preferable because when chilled the disconnector is not wet by the wax. It is also preferable to employ pincers because a single disconnector tends to push successive gobs more or less to one side.

After the gob of wax has been deposited on the jar at the sealing station 9 the jar is moved to the stamping station 10 where the gob is shaped into a seal of the desired shape. For this purpose a shaper 137 is mounted on the lower end of a hollow head 138 through which water is circulated by means of flexible tubes 139 quickly to chill the wax and thereby prevent it from adhering to the shaper (Figs. 5, 13, 17 and 18). The head 138 is mounted on the end of the rocker arm 140 which is pivoted to the frame of the machine at 118. The arm carries a roller 142 bearing on the cam 119 fast to the rocker shaft 105. To hold the roller 142 in contact with the cam a spring 143 is anchored to the outer end of the arm 140 at 163 and at its lower end to the frame by means of a pin 145 (Fig. 13).

The gobs of wax may be caused to adhere more firmly to containers made of glass and the like by preheating the spots to which the gobs are to be applied. Preferred means for this purpose comprises a gas jet 201 at the second turret station (Figs. 1 and 3) for directing flame 200 to the seal spot of each jar just before the jar is advanced to the wax-applying station 9. While this flame may burn steadily it is preferably turned down just before the end of each cycle and then turned up after the turret stops during the next cycle (see curve C, Fig. 2). For this purpose the gas line may comprise two branches (Fig. 3) containing valves 202, 203 and 204, the first two controlling the minimum and maximum size of the flame, respectively, and the latter being of the well-known type having a spring for closing the valve and a rod 205 for opening the valve. As shown in Figs. 3, 4 and 5 the rod 205 may be actuated by the cam operated arm 206. When valve 204 is closed only enough gas flows through the valve 202 to maintain a pilot flame and when the valve 204 is opened the size of the flame is determined by the setting of valve 203.

While the spots on the containers may be heated to a temperature either above or below the melting point of the wax, they are preferably heated to a temperature at least approximating the melting point of the wax, whereby the bottom surfaces of the gobs of wax which contact with the containers are softened enough to adhere firmly to the containers. By quickly heating only the limited areas of the containers upon which the gobs are to be deposited, the areas cool quickly after the gobs are deposited. Thus the gobs may be deposited in more viscous condition and while the contacting areas of the gobs are liquefied each gob as a whole is not substantially softened. Consequently the gobs may be deposited in non-fluid condition (plastic or solid) without being softened enough to spread excessively after being deposited.

The relative movement of the parts is approximately indicated by the curves in Fig. 2 where the abscissae represent the angular movement of the main drive shaft 29 during one complete revolution. In Fig. 2 the curve A represents rotation of the turret 6, B the in and out movement of the turret lock 44, C the in and out movement of the jar stop 14, D the movement of the jar clamps 67, E the movement of the jar tipper 76, F the movement of the rocker cam shaft 105, G the up and down movement of the wax nozzle 93, H the up and down movement of the wax extruding plunger 99, I the in and out movement of the wax tail disconnector 127, J the up and down movement of the shaper or stamping die 137, and K the up and down movement of the label applier 12. As shown by curve A the turret rotates through the first half of each revolution of the drive shaft 29 and dwells during the latter half of each revolution. As shown by curve B the turret lock 44 moves out of locked position during the first few degrees of rotation of the drive shaft 29 and moves back into locked position when the turret comes to a stop.

Referring to curve C the jar stop 14 moves in behind the foremost jar to the position shown in Figs. 3, 4 and 5 during the first few degrees of rotation, thereby holding back the succeeding jars while the foremost jar is picked up by the jar holder and tipped into horizontal position. Curve C also shows that the flame 200 for preheating the area of the jar to which the seal is to be applied (Figs. 1 and 3) may be applied after the turret comes to rest and later turned down before the end of the cycle. As shown by curve D the jar stop moves out of the path of the oncoming jaws at approximately the middle of each cycle, after the preceding jar is well out of the way, to permit the next jar to be moved by the belt 8 into position to be picked up by the turret mechanism. As shown by curve E the jar tipper 76 may tip the jar to horizontal position during one step of the turret, but as described above and as illustrated in Figs. 1 and 3, the jar is tipped from upright to horizontal position during two steps of the turret and back again during one step.

Comparing curves G and H it is evident that the wax nozzle starts down somewhat before the extruding plunger 99 starts up and that the wax is extruded between 240° and 300° while the extruding plunger 99 is moving down and the wax nozzle is moving back up. By bringing the tip of the nozzle into close proximity to the jar before the wax starts to extrude the gob of wax may be accurately located on the jar. In the illustration the gob is deposited in the crack between the bead 75 on the neck of the jar and the lip 150 of the cap 151. A certain amount of wax is extruded while the nozzle is down to fill the crack. If it is desired to deposit a long narrow gob extending lengthwise of the crack the outlet of the nozzle may be in the form of a slit extending lengthwise of the crack or in the form of a series of apertures arranged in a row extending lengthwise of the crack.

It should be understood that the present disclosure is for the purpose of illustration only and that this invention includes all modifications and equivalents which fall within the scope of the appended claims.

1. Apparatus for applying a seal to the side of a container comprising means for delivering a container to a location in upright position, means at the location for overturning the container into a tipped position in which one side of the container is directed upwardly, and means for applying a gob of sealing material to said side of the container while the container is in said tipped position.

2. Apparatus for applying a seal to the side of a container comprising a conveyor for successively delivering containers to and from a location, means at the location for removing each successive container from the conveyor and overturning it into a tipped position, means for applying a gob of sealing material to the side of the container while the container is in said tipped position, means for shaping and cooling said material after it is applied to the container, and means for tipping the container back into upright position and replacing it on said conveyor.

3. Apparatus for applying a seal to the side of a container comprising a turret intermittently rotatable about an upright axis to bring containers successively to different stations including a sealing station and a delivery station, a conveyor belt extending past the turret, means on the turret for removing a container from the conveyor and overturning it to a tipped position before it reaches said sealing station, means at the sealing station for applying a gob of sealing material to the side of the container, means for shaping and cooling said material after it is applied to the container, and means for tipping the container back to upright position as it approaches said delivery station.

4. Apparatus for applying a seal to the side of a container comprising means for delivering a container to a location in upright position, means at the location for overturning the container into a tipped position, means for applying a gob of sealing material to the side of the container while the container is in said tipped position, and means for shaping and cooling said material after it is applied to the container.

5. Apparatus for applying a seal to the side of a container comprising a turret intermittently rotatable about an upright axis to bring containers successively to different stations including a sealing station, a stamping station, and a delivery station, a conveyor belt extending past the turret, means on the turret for removing a container from the conveyor and overturning it to a tipped position before it reaches said sealing station, means at the sealing station for applying a gob of sealing material to the side of the container, means at the stamping station for shaping said gob after it is applied to the container, and means for tipping the container back to upright position as it approaches said delivery station.

6. Apparatus for applying a seal to an article comprising a reservoir for the seal material, a dispenser for delivering a gob of the material from the reservoir to the article, and means for disconnecting the trailing end of the gob from the dispenser.

7. Apparatus for applying a seal to an article comprising a reservoir for the seal material, a dispenser for delivering a gob of the material from the reservoir to the article, the dispenser including a nozzle and means for extruding the material through the nozzle, and means for pinching off the trailing end of the gob from the nozzle.

8. Apparatus for applying seals to articles comprising means for conveying the articles to different stations successively, means at one station for applying gobs of sealing material to the articles, means for disconnecting the trailing ends of the gobs, and a stamp at a succeeding station for shaping the gobs.

9. Apparatus for applying seals to articles comprising a reservoir for the seal material, a dispenser for delivering gobs of the material from the reservoir to the article successively, a disconnector for severing the trailing ends of the gobs from the dispenser, and means for chilling the disconnector.

10. Apparatus for sealing a closure on a container having a space between the container and the edge of the closure, comprising a reservoir for sealing material, means for heating the reservoir to maintain the material in fluid condition, a conveyor for delivering the container to a material dispensing station, means for depositing a gob of material from said reservoir to said space at said station, a disconnector for severing the trailing end of said gob, means for chilling the disconnector to a temperature substantially lower than that of the gob, and means for pressing the gob into said space.

11. Apparatus for sealing a closure on a container having a space between the container and the edge of the closure, comprising a reservoir for sealing material, means for heating the reservoir to maintain the material in fluid condition, a dispenser for depositing a gob of material from the reservoir to the container at the edge of the closure, the dispenser including a nozzle and means for extruding material through the nozzle, a disconnector for severing the trailing end of said gob, and means for heating the disconnector to a temperature substantially higher than that of the gob.

12. Apparatus for sealing a closure on a container having a narrow elongate space between the container and the edge of the closure, comprising a reservoir for sealing material, means for heating the reservoir to maintain the material in fluid condition, a holder for the container, a dispenser for depositing a gob of material from the reservoir to a container in said holder, the dispenser including a nozzle having an outlet in the form of a narrow slit and means for extruding material through the slit, means for bringing the nozzle and container together with said slit extending lengthwise of said elongate space, a disconnector for severing the trailing end of said gob, and means for maintaining the disconnector at a temperature substantially different from that of the gob.

13. Apparatus for sealing a closure on a container having a narrow elongate space between the container and the edge of the closure, comprising a reservoir for the sealing material, means for heating the reservoir to maintain the material in fluid condition, a holder for the container, a dispenser for depositing a gob of material from said reservoir to a container in said holder, the dispenser including a nozzle having an outlet in the form of a narrow slit and means for extruding material through the slit, and means for bringing the nozzle and container together with said slit extending lengthwise of said elongate space.

14. Apparatus for applying a seal to an article comprising a reservoir for sealing material, a dispenser for delivering a gob of material from the reservoir to the article, the dispenser including a nozzle for close presentation to the article and means for extruding material through the nozzle, means for producing relative movement between nozzle and article from a retracted position to an operative position where the distance between the nozzle and article is minimum, and means for starting said extrusion while the parts are in said operative position and continuing the extrusion while the parts separate, whereby the gob is accurately located on the article.

15. Apparatus for sealing a closure on a container having a space between the container and the edge of the closure, comprising a reservoir for sealing material, a dispenser for depositing a gob of material from said reservoir to the container at the edge of the closure, said dispenser including a nozzle directed into said space and means for extruding material through the nozzle, means for producing relative movement between nozzle and article from a retracted position to an operative position where the distance between the nozzle and article is minimum, and means for starting said extrusion while the parts are in said operative position and continuing the extrusion while the parts separate.

16. Apparatus for applying a seal to a spot on an article comprising means for heating the spot to a temperature higher than the rest of the article, means for depositing a gob of sealing material on the heated spot, and means for producing relative movement between said means and article to present the article first to one means and then to the other, whereby the gob may be caused to adhere firmly to the article without excessive spreading.

17. The method of applying a seal to a spot on an article which comprises preheating the spot to a temperature at least approximately the melting point of the sealing material and then applying to the spot a mass of the sealing material in non-fluid condition, the heated spot rendering the contacting surface of the mass sufficiently fluid to adhere to the article and then cooling quickly, whereby said mass may be caused to adhere firmly without heating the body of the mass, either before or after it is applied to the article, to the point where it will spread excessively.

18. Apparatus for sealing a cap on a container, the cap having a lip extending downwardly around the upper end of the container with a narrow elongate slit between the container and the edge of the lip, the apparatus comprising a reservoir for sealing material, means for heating the reservoir to maintain the material in fluid condition, a downwardly directed nozzle, a dispenser for delivering a gob of material from said reservoir to said nozzle, holder means which presents the container to the nozzle with the container tipped over on its side and with said elongate slit presented upwardly to receive said gob, and means for then pressing the gob into said slit.

CARL A. FLOOD.